United States Patent
Houser

(10) Patent No.: US 9,359,711 B2
(45) Date of Patent: Jun. 7, 2016

(54) DRYER VENT HOSE ASSEMBLY

(71) Applicant: The Ultimate Drive Vent LLC, Marion, OH (US)

(72) Inventor: Jeffrey D. Houser, Marion, OH (US)

(73) Assignee: Ultimate Dryer Vent LLC, Marion, OH (US)

( * ) Notice: Subject to any disclaimer, the term of this patent is extended or adjusted under 35 U.S.C. 154(b) by 112 days.

(21) Appl. No.: 14/534,949

(22) Filed: Nov. 6, 2014

(65) Prior Publication Data

US 2015/0121715 A1 May 7, 2015

Related U.S. Application Data

(60) Provisional application No. 61/900,619, filed on Nov. 6, 2013.

(51) Int. Cl.
*D06F 58/20* (2006.01)
*F16L 11/12* (2006.01)
*F16L 27/11* (2006.01)
*F16L 27/12* (2006.01)

(52) U.S. Cl.
CPC .............. *D06F 58/20* (2013.01); *F16L 11/12* (2013.01); *F16L 27/11* (2013.01); *F16L 27/12* (2013.01)

(58) Field of Classification Search
CPC ......... D06F 58/00; D06F 58/20; D06F 58/23; F26B 21/00; F26B 21/06; F26B 25/00
USPC ........ 34/595, 601, 606, 610; 68/5 C, 5 R, 19, 68/20; 8/139, 149, 159
See application file for complete search history.

(56) References Cited

U.S. PATENT DOCUMENTS

| | | | | |
|---|---|---|---|---|
| 4,890,396 A | * | 1/1990 | King | D06F 58/20 34/235 |
| 4,969,276 A | * | 11/1990 | Walsh | D06F 58/22 34/235 |
| 5,318,328 A | * | 6/1994 | Dawson | D06F 58/04 285/148.2 |
| 5,628,122 A | * | 5/1997 | Spinardi | D06F 58/22 137/132 |
| 6,098,312 A | * | 8/2000 | Tuggle | D06F 58/20 285/183 |
| 6,189,228 B1 | * | 2/2001 | Schuette | D06F 58/20 34/235 |
| 7,047,664 B1 | * | 5/2006 | Martinez | D06F 58/22 34/380 |

(Continued)

FOREIGN PATENT DOCUMENTS

BE EP 2423375 A1 * 2/2012 ............. D06F 58/02

*Primary Examiner* — Stephen M Gravini

(74) *Attorney, Agent, or Firm* — Mueller Law, LLC; Jerry K. Mueller, Jr.

(57) ABSTRACT

The disclosed dryer vent is a spring-loaded, expandable/retractable dryer vent assembly. The assembly houses a flexible dryer vent aluminum hose with spiral wire. The flexible aluminum dryer vent hose has a plurality of spring rings therearound allowing springs to be attached therebetween. The ends of the flexible dryer vent hose are clamped with a clamp assembly that also has mounts for additional springs. The end clamp assembly clamps the flexible dryer vent hose at each end to annular duct pieces that mount to the dryer or the household wall. The dryer vent hose freely rotates and can be expanded, retracted, or twisted without kinking.

4 Claims, 4 Drawing Sheets

(56) References Cited

U.S. PATENT DOCUMENTS

| | | | | |
|---|---|---|---|---|
| 7,213,349 B1* | 5/2007 | Brunner | D06F 58/20 | 34/86 |
| 7,421,804 B1* | 9/2008 | Hession | D06F 58/20 | 34/601 |
| 8,250,778 B2* | 8/2012 | Hodges | D06F 58/20 | 126/588 |
| 8,499,473 B2* | 8/2013 | Dal Ben | D06F 58/04 | 34/603 |
| 8,893,399 B2* | 11/2014 | Gregory | F26B 25/007 | 34/381 |
| 9,103,589 B2* | 8/2015 | Sullivan | F26B 25/009 | |
| 9,291,393 B2* | 3/2016 | Knowles | F26B 25/08 | |
| 2002/0108265 A1* | 8/2002 | Seeley | D06F 58/20 | 34/138 |
| 2002/0184786 A1* | 12/2002 | Miller, II | D06F 58/20 | 34/132 |
| 2008/0047159 A1* | 2/2008 | Mackay | D06F 58/20 | 34/82 |
| 2008/0141555 A1* | 6/2008 | Hoogendoorn | D06F 58/20 | 34/235 |
| 2009/0151186 A1* | 6/2009 | Filmore | D06F 58/20 | 34/82 |
| 2009/0277034 A1* | 11/2009 | Wilson | D06F 58/22 | 34/82 |
| 2010/0112815 A1* | 5/2010 | O'Dougherty | B67D 7/0261 | 438/689 |
| 2012/0073158 A1* | 3/2012 | Sciallo | D06F 58/20 | 34/235 |
| 2015/0121715 A1* | 5/2015 | Houser | F16L 11/12 | 34/235 |
| 2015/0217074 A1* | 8/2015 | Wells | A61M 16/0683 | 128/207.18 |

\* cited by examiner

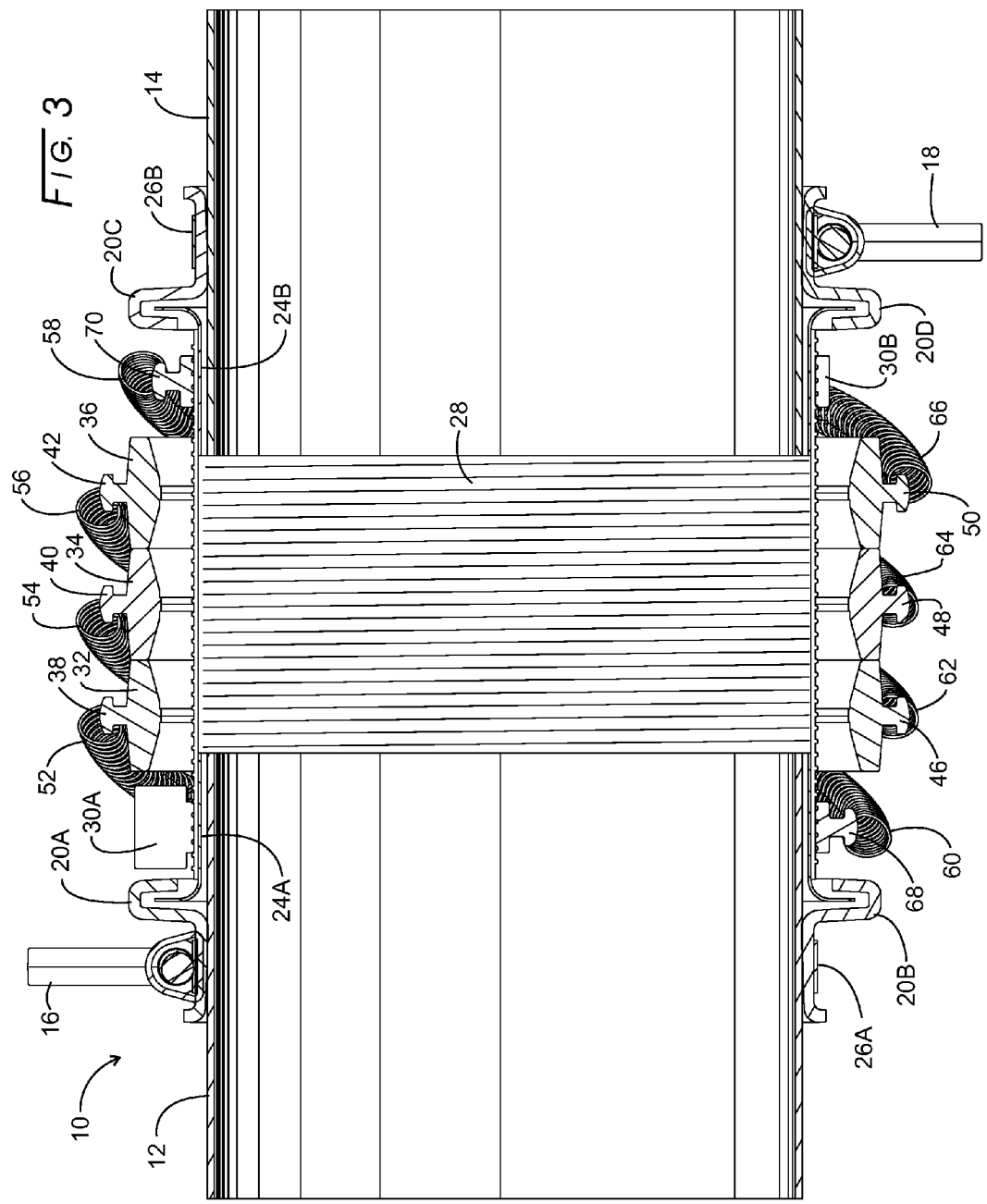

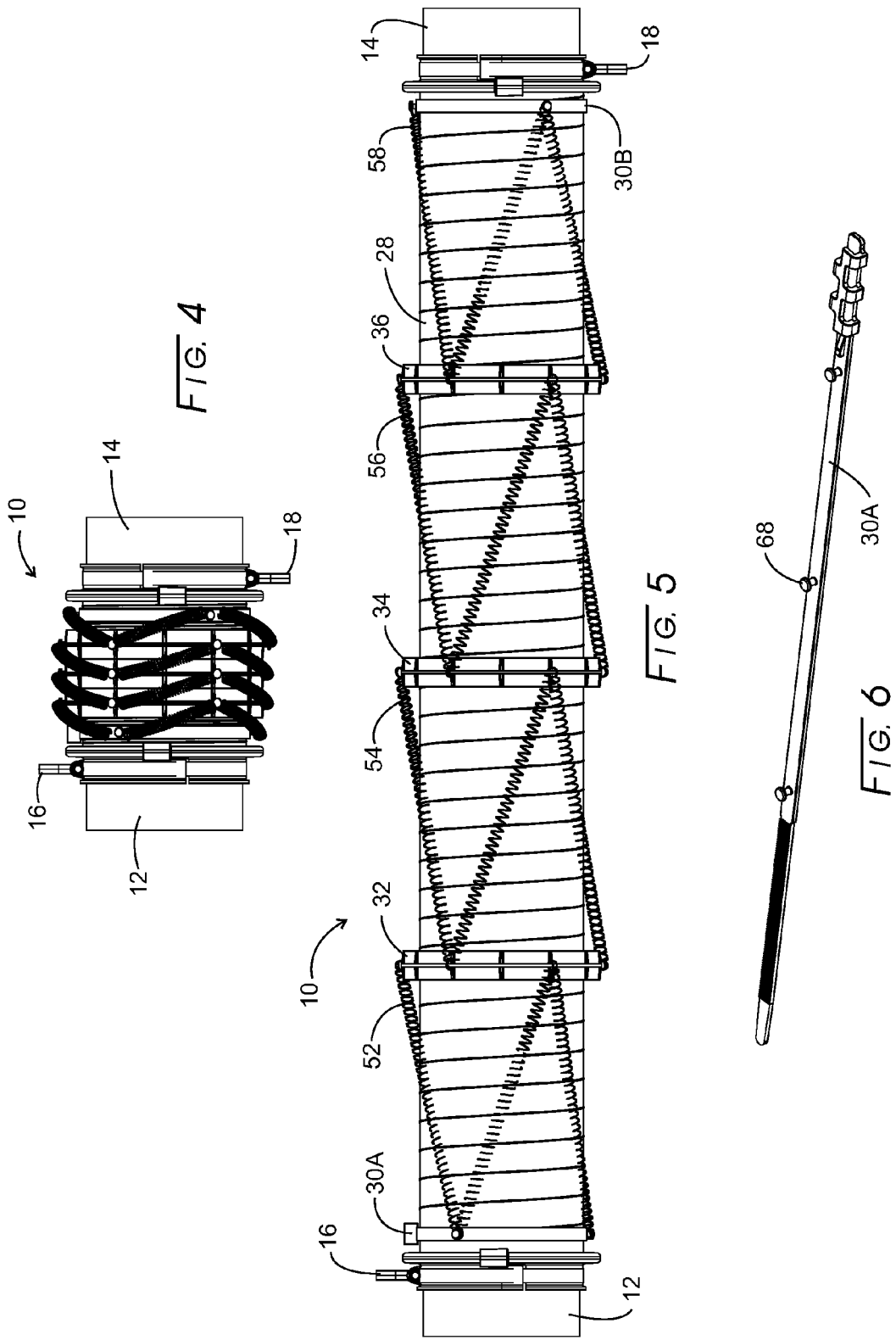

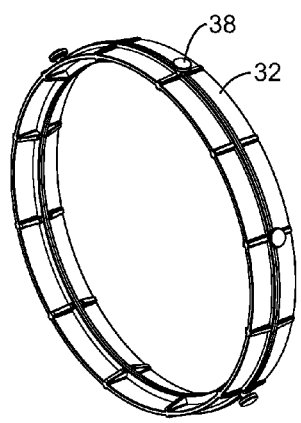
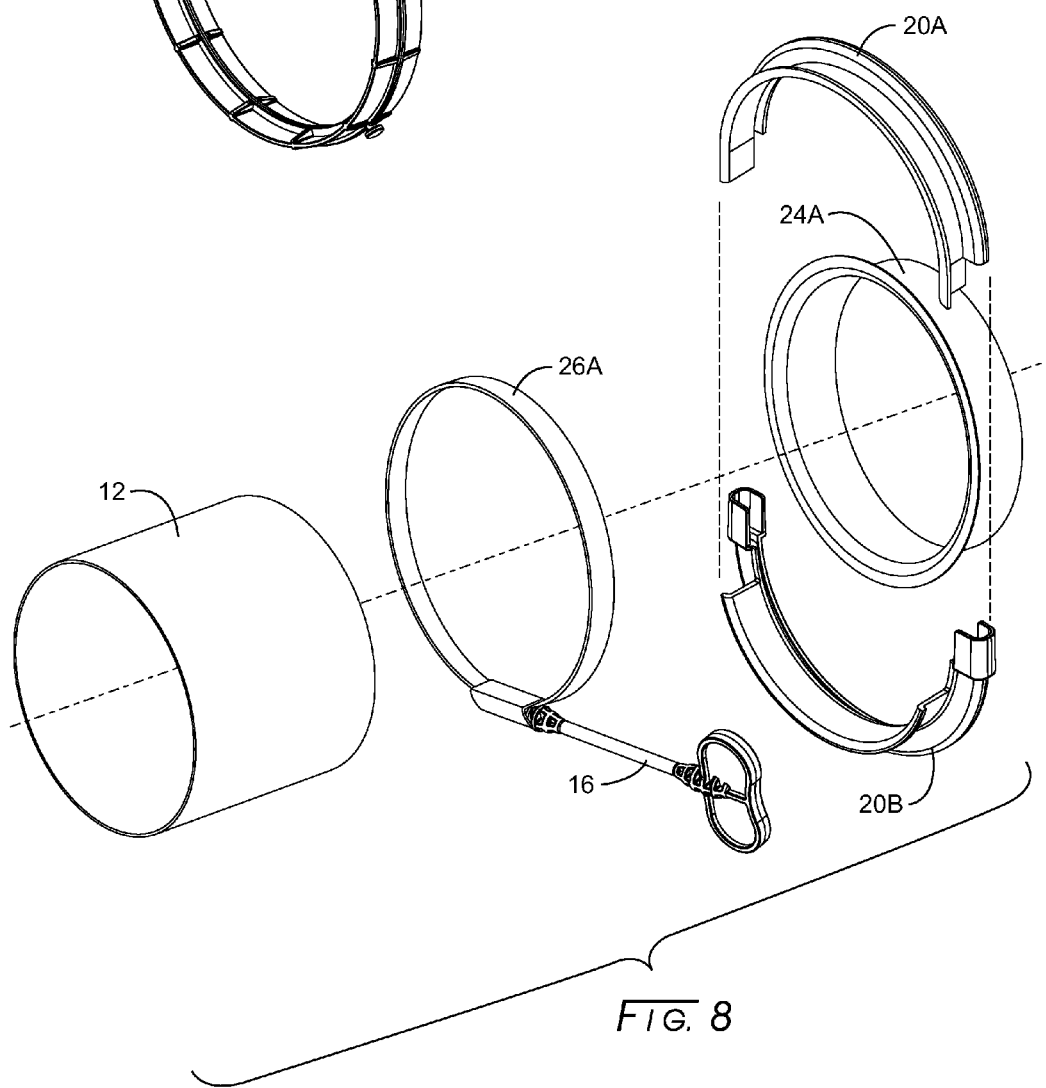

DRYER VENT HOSE ASSEMBLY

CROSS-REFERENCE TO RELATED APPLICATIONS

This application claims benefit of provisional application Ser. No. 61/900,619, filed on Nov. 6, 2013.

STATEMENT REGARDING FEDERALLY SPONSORED RESEARCH

Not applicable.

BACKGROUND

The present disclosure relates to dryer vent hoses that connect clothes dryers to vents that communicate to the outside and more particularly to a much-improved dryer vent hose assembly.

Installing a dryer can be a frustrating task to the average consumer. To set the scene, the customer fights with a heavy dryer to get it into a home and places it into the laundry area. The customer aligns the dryer to the location where it will sit. A normal dryer hook up will have a pan that sits into the wall of the home and there is a four-inch diameter duct protruding through it. The installer will need two hose clamps and a piece of flexible four-inch aluminum duct to properly vent the dryer to the outdoors.

Next, the consumer has to slide the hose clamps over the flexible duct and mount the flexible duct to the dryer on one end and to the wall at the other end, while securing the vent hose with hose clamps. This is very complicated due to the spiral wire in the flex duct and the wire's propensity to tear the flex duct due to the sharp edges on the wall and dryer duct. If the consume is unaware that the flex duct is torn, the dryer will exhaust inside the home causing dust and poor dryer operation.

The next problem occurs when the installer pushes the dryer into place. The dryer blocks the installer's vision of the flex duct and the flex duct is limp sitting behind the dryer. As the installer pushes the dryer towards the wall, the flex duct can become kinked and twisted. When the flex duct becomes kinked, twisted, or smashed, the dryer will not vent properly and will slow down dry times and again decrease dryer efficiency.

Thus, there exists a need for an improved dryer vent hose assembly that is simple to install and difficult to kink. The present disclosure addresses such needs.

BRIEF SUMMARY

A dryer vent hose assembly includes a flexible dryer vent hose having a proximal end and a distal end. The dryer vent hose proximal and distal ends each attached to a rigid annular dryer tube outlet ring slidable into mating relationship to an air exhaust opening of a clothes dryer and into a wall exhaust vent opening. Each rigid annular dryer tube is secured by a rotator clamp assembly having an upstanding circumferential groove into which an upstanding lip of a rotator coupler. A clamp assembly fits around the rotator coupler clamp assembly to secure the rotator coupler clamp assembly to the rotator coupler ring. The rotator coupler ring is freely rotatable. The flexible dryer vent hose fits over the rotator coupler ring annular flat area. A cable tie clamp assembly having upstanding spring clips fits around and secures the flexible dryer vent hose to the rotator coupler ring. A series of spring rings having upstanding spring clips fits around the flexible dryer vent hose. A plurality of springs clip onto each adjacent spring rings and to the cable tie clamp assembly. The dryer vent hose freely rotates and can be expanded, retracted, or twisted without kinking.

BRIEF DESCRIPTION OF THE DRAWINGS

For a fuller understanding of the nature and advantages of the present method and process, reference should be had to the following detailed description taken in connection with the accompanying drawings, in which:

FIG. 3 is a sectional view taken along line 3-3 of FIG. 2;

FIG. 4 is a side view of the dryer vent hose in compressed or unexpanded state;

FIG. 5 is a side view of the dryer vent hose in an expanded state;

FIG. 6 is an isometric view of the zip tie that clamps the dryer vent hose assembly to the rotator coupler ring;

FIG. 7 is an isometric view of the spring ring; and

FIG. 8 is an exploded isometric view of the pivot joint assembly.

The drawings will be described in greater detail below.

DETAILED DESCRIPTION

The disclosed dryer vent hose assembly is unique in that it rotates freely at both ends, is stable in a compressed state, is stable in a partially expanded state, and is stable in a fully expanded state. No tools are required to install or uninstall the disclosed dryer vent hose assembly. Pushing the dryer back towards the wall where the dryer vent hose assembly is attached to the wall cannot kink the dryer vent hose assembly. Thus, the disclosed dryer vent hose assembly is truly unique.

Figure 1:
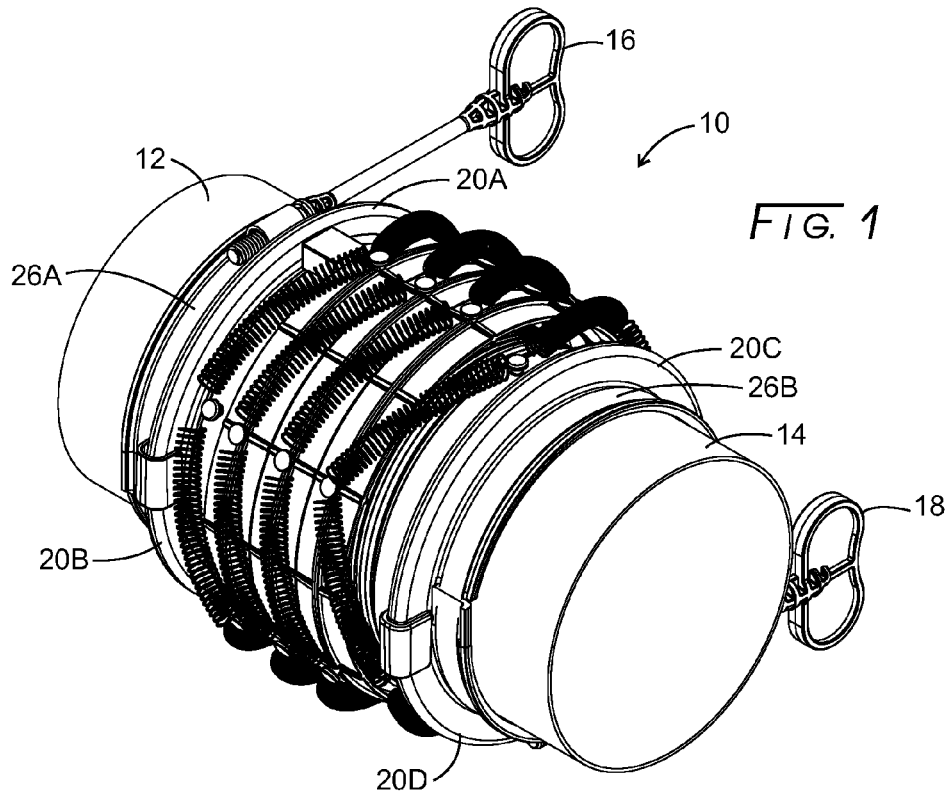
FIG. 1 is an isometric view of the disclosed dryer vent hose assembly.
Figure 2:
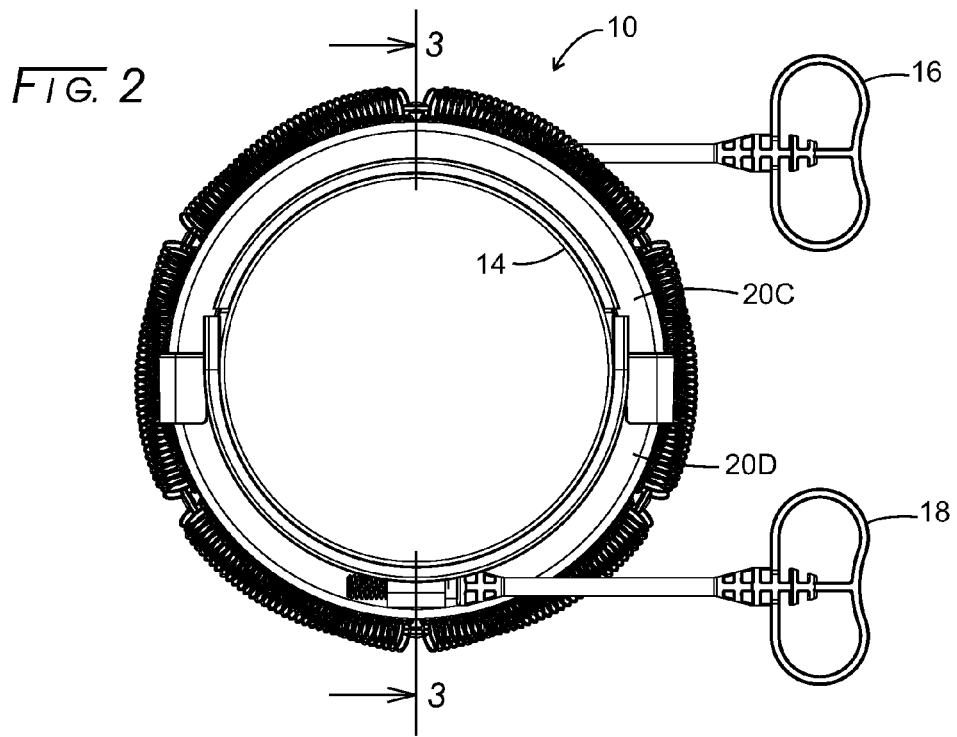
FIG. 2 is an end view of the dryer vent hose assembly of FIG. 1.

Referring initially to FIGS. 1 and 2, a dryer vent hose assembly, 10, has a pair of solid annular attachment rings, 12 and 14, that push into the dryer vent located at the rear of the dryer and into the vent opening in the wall behind the dryer. A pair of rotatable, tightening keys (toolless keys), 16 and 18, are seen located at either end of the dryer vent hose assembly and will be described in detail later. Also seen are pluralities of springs that connect adjacent spring rings to each other. The dryer vent hose assembly in the drawings has 4 sections with 3 interior spring rings. A greater or lesser number of sections/interior spring rings could be provided as is necessary, desirable, or convenient.

Referring now to FIGS. 3 and 8, dryer vent hose assembly 10 is seen in its compressed state along with the details of the clamp assemblies that permit the dryer hose to rotate freely while solid annular attachment rings 12 and 14 are secured tightly into the back of the dryer and into the outlet vent in the wall. In particular, the two clamping assemblies are identical in structure and operation. Thus, the components will be labeled as "A" for attachment ring 12 and "B" for attachment ring 14. It does not matter whether attachment ring 12 or 14 is inserted into the back of the dryer and they are entirely interchangeable, thus adding to the ease of its use. For ease of description, only the "A" components will be described in detail, while both sets of components are labeled in the drawings.

A rotator coupler clamp composed of two halves, 20A and 20B, each have a groove into which the upstanding lip, 22A, of a rotator coupler ring, 24A, loosely fits. A clamp assembly, 26A, tightenable with toolless screw 16 fits over rotator coupler clamp halves 20A and 20B (20C and 20D for the other assembly), and is tightened around the assembly and dryer vent tube outlet 12 to securely attach the entire assembly together. Despite the clamping action of clamp assembly 26A, rotator coupler ring 24A can freely rotate while dryer vent tube 12 is held securely in place. A dryer vent tube, 28, fits over the flat end of rotator coupler ring 24A and is held securely in place by a cable tie or tie-wrap, commonly known as a hose tie, zap-strap or zip tie, 30A, or other similar tie assembly.

A series of spring rings, 32, 34, and 36, fit snugly over dryer vent hose 28, which commonly is a thin aluminum hose with interior spiral metal spring, and has upstanding spring clips, 38, 40, 42, 46, 48, and 50, for capturing a series of springs. While additional spring are not shown in the drawings, the springs shown in FIG. 3 are springs, 52, 54, 56, 58, 60, 62, 64, and 66. The ultimate end springs are attached to cable ties 30A and 30B, which also have upstanding spring clips, such as cable tie spring clips, 68 and 70 as shown in FIG. 3. The springs are in a compressed state when dryer vent hose assembly 10 is in a compressed state, such as shown in FIG. 3.

A side view of dryer vent hose assembly 10 is illustrated in FIG. 4. Dryer vent hose assembly 10 is shown in its expanded state in FIG. 5. Regardless of how far dryer vent hose assembly 10 is expanded, the springs hold the dryer vent assembly in a stable state. Thus, when the dryer is moved away from or towards the wall at the rear of the dryer, the springs expand or compress, while the dryer vent hose is allowed to rotate freely inside each end assembly. The dry vent hose will not kink or twist during either operation.

Spring ring 38 is illustrated in FIG. 7. The series of upstanding spring clips are visible in this enlarged view. Springs are clipped onto adjacent spring rings around the circumference of dryer vent hose assembly 10.

Most of the components described will be formed from plastic resistant to the heat normally associated with venting hot air from a clothes dryer, other than the vent hose itself which most often is formed from thin aluminum with an interior metal spiral. Other materials of construction could be used, however.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A dryer vent hose assembly, comprises:
(a) a flexible dryer vent hose having a proximal end and a distal end;
(b) said dryer vent hose proximal and distal ends each attached to a rigid annular dryer tube outlet ring slidable into mating relationship to an air exhaust opening of a clothes dryer and into a wall exhaust vent opening;
(c) each rigid annular dryer tube secured by a rotator clamp assembly having an upstanding circumferential groove into which an upstanding lip of a rotator coupler ring fits, said rotator coupler ring having a flat annular area at its opposite end;
(d) a clamp assembly fits around said rotator coupler clamp assembly to secure the rotator coupler clamp assembly to the rotator coupler ring, said rotator coupler ring being freely rotatable;
(e) the flexible dryer vent hose fits over the rotator coupler ring annular flat area;
(f) a cable tie clamp assembly having upstanding spring clips fits around and secures the flexible dryer vent hose to the rotator coupler ring;
(g) a series of spring rings having upstanding spring clips fits around the flexible dryer vent hose; and
(h) a plurality of springs clip onto each adjacent spring rings and to the cable tie clamp assembly;
the dryer vent hose freely rotates and can be expanded, retracted, or twisted without kinking.

2. The dryer vent hose assembly of claim 1, wherein said dryer vent hose comprises an expandable aluminum tube reinforced by a spiral metal spring.

3. The dryer vent hose assembly of claim 1, wherein a cable tie clamp assembly comprises a zip tie.

4. The dryer vent hose assembly of claim 1, wherein said dryer vent hoses is between about 3 feet and 4 feet in length.

* * * * *